United States Patent [19]

Sorg

[11] Patent Number: 5,399,181
[45] Date of Patent: Mar. 21, 1995

[54] METHOD AND APPARATUS FOR PREHEATING CHARGING MATERIAL HAVING ORGANIC CONTAMINANTS FOR GLASS MELTING FURNACES

[75] Inventor: Helmut Sorg, Glattbach, Germany

[73] Assignee: Beteiligungen Sorg GmbH & Co. KG, Lohr, Germany

[21] Appl. No.: 175,270

[22] Filed: Dec. 29, 1993

[30] Foreign Application Priority Data

Jun. 16, 1993 [DE] Germany .................. 43 19 691.8

[51] Int. Cl.⁶ .............................................. C03B 3/02
[52] U.S. Cl. .......................................... 65/27; 65/28; 65/136.1; 65/335
[58] Field of Search .................. 65/27, 134, 335, 347, 65/28, 136.1; 134/2, 19

[56] References Cited

U.S. PATENT DOCUMENTS

| | | | |
|---|---|---|---|
| 3,912,534 | 10/1975 | Gurta | 65/28 |
| 4,145,202 | 3/1979 | Grodin et al. | 65/28 |
| 4,347,073 | 8/1982 | Aubourg et al. | 65/28 |
| 4,353,726 | 10/1982 | Rough, Sr. | 65/27 |
| 4,462,815 | 7/1984 | Propster et al. | 65/27 |
| 5,156,545 | 10/1992 | Deblock . | |

FOREIGN PATENT DOCUMENTS 2932052  2/1980  Germany .

Primary Examiner—Joye L. Woodard
Attorney, Agent, or Firm—Hill, Steadman & Simpson

[57] ABSTRACT

A method and apparatus for preheating material in a glass melting furnace is provided. An indirect heat exchanger is utilized in which exhaust gases from the glass melting furnace are directed, in a counter flow relation, to raw materials and glass cullet being fed into a glass melting furnace. A first conduit is connected to the heat exchanger to withdraw gases formed from the decomposition of organic matter present in the materials being preheated and the gases are directed by the conduit into the glass melting furnace where they are combusted. A second conduit may also be provided for extracting water vapor released from the preheated materials prior to decomposition of the organic material.

18 Claims, 2 Drawing Sheets

5,399,181

METHOD AND APPARATUS FOR PREHEATING CHARGING MATERIAL HAVING ORGANIC CONTAMINANTS FOR GLASS MELTING FURNACES

BACKGROUND OF THE INVENTION

The invention is directed to a method and apparatus for preheating glass and raw materials containing organic materials in an indirect heat exchanger, which has at least one preheating shaft and an adjacent heating chamber, to temperatures up to a maximum just below the softening temperature of the glass, for subsequent charging into a glass melting furnace, by passing the charging material through at least one preheating shaft and by heating the heating chamber with waste gases from the glass melting furnace.

In the case of indirect heat exchangers, the heat emitting and the heat absorbing media are separated from one another in order to prevent mixing.

In conjunction with glass melting furnaces it is also known that the raw material, which includes glass forming materials, the so-called batch, and cullet from recycled glass, can be heated in indirect heat exchangers by the waste gases from the melting furnace, for example in order to avoid the transfer of unwanted components present in waste gases to the raw material. This method does not lead to problems as long as the raw material only contains water. The batch normally contains approximately 4% water, the cullet approximately 1-1.5% water. The water is normally released from the raw material in the form of water vapor, which can be discharged to the surroundings without any particular problems. In fact, unless specific steps are taken this cannot be prevented, as the heat exchanger has openings at the inlet and outlet points for the raw material, through which the water vapor can exit.

However, preheating of raw material with recycled glass causes problems if the recycled glass contains organic substances or contaminant materials, the previous removal of which is either difficult or at least very expensive, and which undergo a carbonization process during preheating to the usual preheat temperatures, which leads to the formation of gases and vapors, which must not be released into the atmosphere because of environmental protection regulations.

These organic substances include paper, plastics and adhesives from labels, plastic coatings on bottles, plastic bottle tops, and also contamination resulting from the original contents. Also, corks are included as an organic contaminant material.

For economic reasons the raw material should be preheated to as high a temperature as feasible, if possible to just under the temperature at which the raw material tends to agglomerate. If glass cullet is present, this process begins above the softening temperature of the glass, so that the preheating is normally completed at a maximum temperature of approximately 550° C.

At such temperatures however a carbonization process takes place, in which non-filterable gaseous or vaporous compounds such as carbon monoxide, organic cracking products, dioxines, furanes and the dangerous halogenated hydrocarbons are formed. If no specific steps are taken, these gases and vapors are also emitted from an indirect heat exchanger, as a chimney effect occurs in the type of preheating shaft normally used.

The German patent DE-PS 2,932,052 teaches that is possible to introduce glass raw materials and waste glass containing harmful organic materials into the glass melt of a glass melting furnace at various locations, and to control the furnace atmosphere so that there is an oxidizing atmosphere with high temperatures at the locations at which the waste glass with the organic materials is introduced, so that the organic materials are incinerated in the glass melting furnace. However, the maintenance of stable operation is complicated, and the formation of carbon-rich cords in the glass melt cannot be avoided, which leads to unusable end products. The energy consumption of such a melting process is also unsatisfactory, as the recycled glass, which normally forms the largest proportion of the material introduced into the furnace, is not preheated. This therefore concerns a non-generic process.

U.S. Pat. No. 5,156,545 describes a further non-generic process, the main objective of which is the use of a pyroytic process for the treatment of glass fibers that are contaminated with organic materials, so that the fibers can be re-melted in a glass melting furnace. This is not a preheating process, as it is permissible to dump the end product. The pyrolytic process is carried out on loose piles of material, which are passed through a combustion chamber on a conveyor belt. In this case the material to be processed also has a tendency to stick, and so the temperature must be limited to prevent sticking, which means that the temperature must be kept below 550° C. The only information given about the gas required for the pyrolysis is that it should contain less than 10% oxygen, in order to avoid local high temperatures, which could cause the material to stick. Since this means that full pyrolysis is not possible, it is stated that the waste gases from the process should be passed through gas treatment equipment and, if necessary, they should be recirculated. It is also stated that the pyrolysis gases should be transported to a special chamber for incineration. A combination of the energy balance of the pyrolysis process with that of the glass melting furnace is apparently not taken into consideration. Process operation, and the necessary equipment are complicated and expensive, and the method is therefore only suitable for special waste products, not for a normal glass melting process.

SUMMARY OF THE INVENTION

An object of the present invention is therefore the further development of a method of the type described initially so that raw material with organic contaminants of the type already mentioned can also be preheated to a relatively high temperature, without the decomposition products of the organic additives, the so-called low temperature carbonization gases, being released to the atmosphere, and without the necessity for complicated gas recirculation equipment and/or special combustion equipment for incineration. In particular, a high proportion of the energy contained in the waste gases of the glass melting furnace should be recovered by the preheating process.

This object is achieved by the method described initially according to the invention in that the gases and vapors produced by the organic contaminants are at least partially, but preferably completely, led from the heat exchanger into the glass melting furnace.

As a result of this method it is not necessary to install a special incinerator or a gas recirculation system, but the glass melting furnace itself serves as the incinerator for the gases and vapors from the organic contaminants.

Since temperatures between 1100° and 1600° C. normally occur in such a glass melting furnace, and the use of burners results in part in very hot flames, the gases and vapors mentioned are incinerated to form largely harmless compounds, which can be released to the atmosphere with the waste gases from the glass melting furnace. If necessary, these waste gases can be passed through special filters and gas cleaning equipment, but the final combustion products from the organic contaminants do not present any particular additional load for these waste gas cleaning units.

It is particularly advantageous when the release of the gases and vapors from the organic contaminants in the heat exchanger is carried out at a pressure below the ambient pressure. This can be simply achieved by fitting an exhaust fan in a pipe provided to transport the carbonization gas, so that a partial vacuum is produced in the preheating shaft of the heat exchanger. This not only prevents the gases produced from being released to the atmosphere, but the equipment can be designed to aspirate a small, controlled amount of outside air into the heat exchanger from where it is passed to the glass melting furnace with the carbonization gases.

It is particularly advantageous if the raw material flows from top to bottom through the heat exchanger, which has a minimum of one vertical preheating shaft, and if the gases and vapors in this minimum of one preheating shaft are exhausted from the lower area. In the lower part of the pre-heating shaft the raw material has the highest temperature, in particular when the waste gas from the glass melting furnace flows in counterflow through the heating chamber, i.e. from bottom to top.

It is a further advantage if water vapor from the raw material is removed from a point on the minimum of one preheating shaft, this point being above the exhaust location for the other gases and vapors, and at a point at which the temperature dependent decomposition of the organic contaminants has not yet started. In such a case it is possible to release the water vapor directly into the atmosphere.

Basically it is possible to pass the water vapor to the glass melting furnace, but this has a slight negative effect on the energy consumption of the furnace. The method of handling utilized for the water vapor also depends to some extent on the level of environmental protection regulations which have to be complied with.

The gases and vapors freed from the raw material can be led into the glass melting furnace at different locations, for example in the combustion air supply, in the combustion chamber of the glass melting furnace and-/or in a burner, when, for example, the latter is provided with coaxial burner pipes.

Even better results can be achieved if the waste gases from the glass melting furnace area are led through a regenerative or recuperative heat exchanger before they enter the indirect heat exchanger.

Finally the invention also concerns an apparatus to carry out the method described above, with an indirect heat exchanger, that has at least one preheating shaft for the passage of the raw material and a heating chamber for passage of the heating medium, adjacent to but separate from the preheating shaft, this heat exchanger being connected to a glass melting furnace, the heating chamber of the heat exchanger being connected to the waste gas flue of the glass melting furnace and the charging opening of the furnace being connected to the at least one preheating shaft by a conveying device.

In order to achieve the object the at least one preheating shaft is connected to the glass melting furnace by a carbonization gas pipe.

BRIEF DESCRIPTION OF THE DRAWINGS

A typical example of the invention is explained in more detail with reference to the figures.

DETAILED DESCRIPTION OF THE PREFERRED EMBODIMENTS

Figure 1:
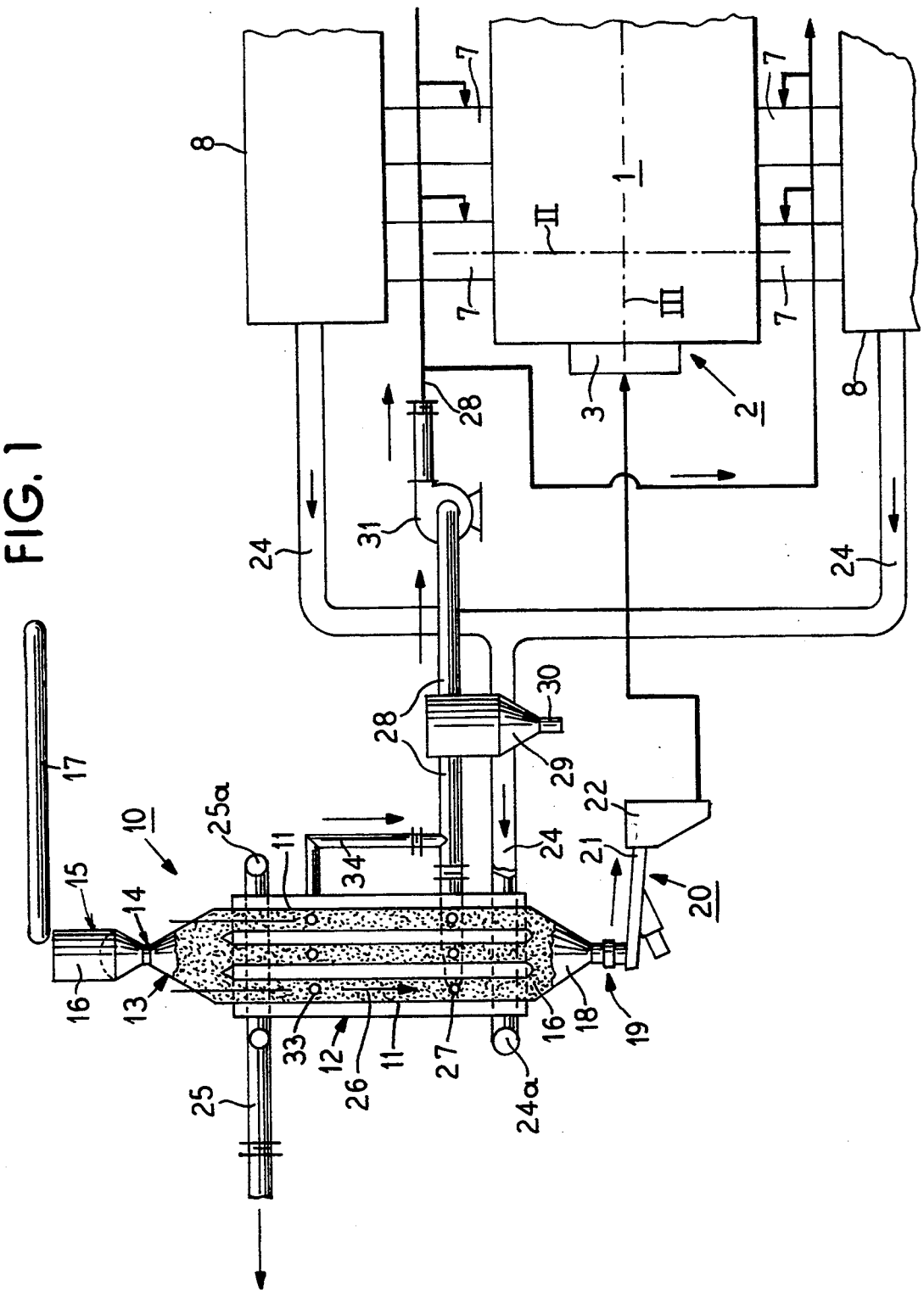
FIG. 1 shows a flow diagram of a vertical section through a preheating unit in detail in connection with a top view of a glass melting furnace shown schematically.
Figure 2:
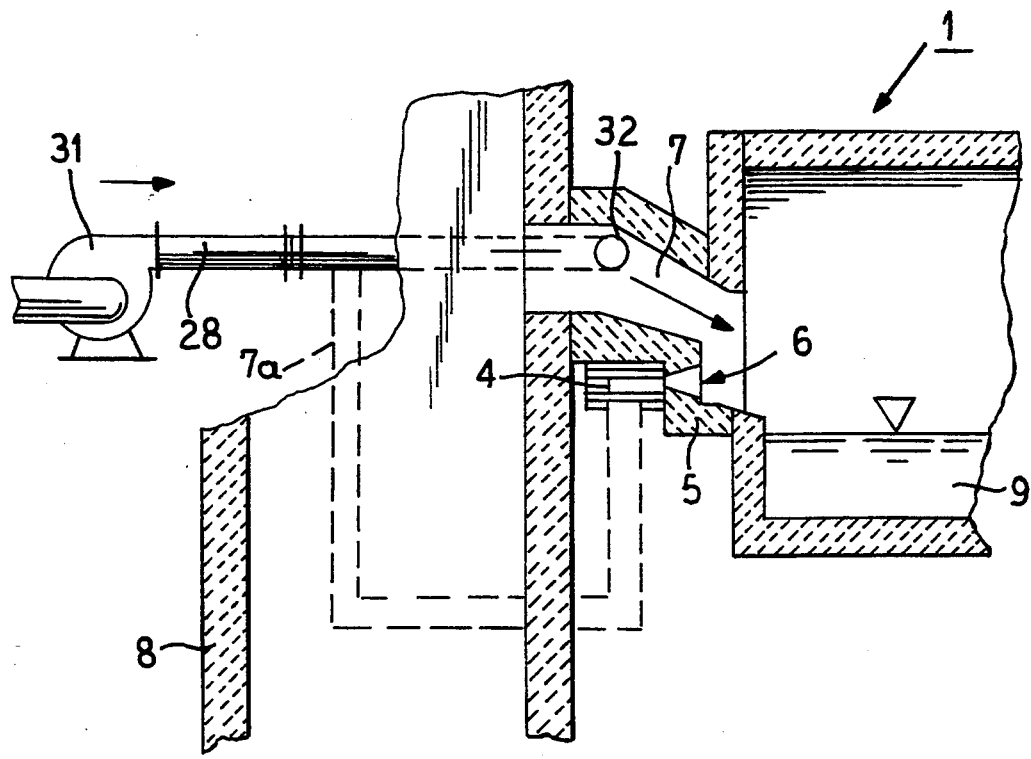
FIG. 2 shows a partial vertical section through a zone of the glass melting furnace along the line II of FIG. 1.
Figure 3:
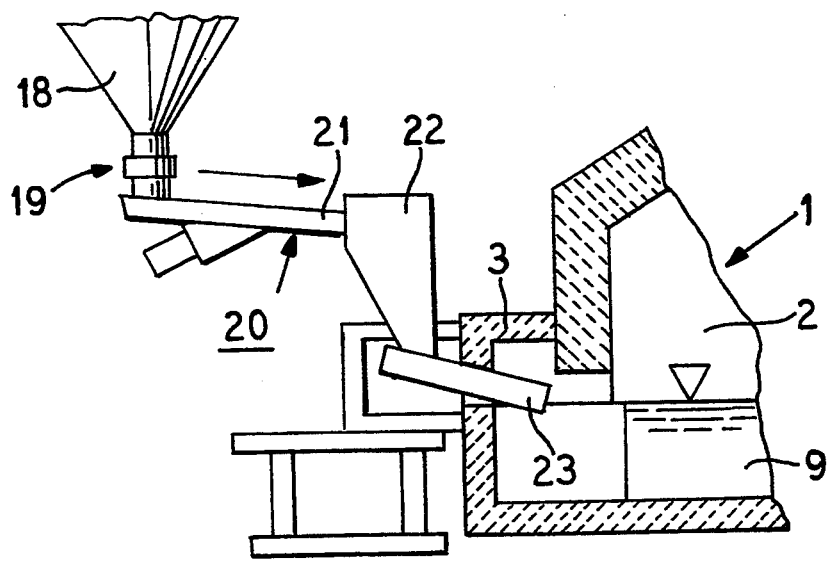
FIG. 3 shows a partial vertical section through a zone of the glass melting furnace along the II in FIG. 1.

FIGS. 2 and 3 show two partial sections through one and the same glass melting furnace 1, illustrated schematically in FIG. 1 FIG. 3 is a cross section through the charging area 2 of the furnace, which includes an unspecified charging opening, which is part of a so-called "dog house" 3. FIG. 2 is a cross section in the area of a burner 4, of which only the burner block 5 and the burner opening 6 are shown. Above the burner opening 6 there is an air supply opening 7, through which the combustion air flows in the direction of the arrow. The combustion air is also preheated by a regenerative or recuperative air preheater 8, of which also only a part section is shown. The melting tank 9 belongs to the glass melting furnace 1. Such details represent state of the art technology such as shown in U.S. Pat. No. 4,882,736 incorporated herein by reference, and so no further detailed information is required here.

An indirect heat exchanger 10, with three vertical preheating shafts 11 and a heating chamber 12, that are separated from one another by the walls of the preheating shafts 11, is connected to the glass melting furnace 1. The preheating shafts 11 begin at a distributor unit 13, which is connected by a metering and feeding lock 14 to a storage bunker 15, which contains the raw material 16. A belt conveyor 17 supplies the raw material, which in this particular case consists of a mixture of cullet and batch, to the storage bunker.

At the bottom of the heat exchanger 10 the preheating shafts 11 are joined together by a collecting device 18, which is funnel shaped, and the discharge outlet 19 of which leads to a transport unit 20, which has a vibratory transport chute 21. The latter ends in an intermediate bunker 22, which is connected to the charging device 23, through which the preheated raw material is laid in strips on the glass melt in the melting tank 9.

The heating chamber 12 is connected at the bottom end to a waste gas flue 24, by means of branch pipes, which are not shown in the diagram, and the ring distributor 24a, which is part of the said gas flue 24. The waste gas flue 24 comes from the glass melting furnace 1.

The upper end of the heating chamber 12 is connected by a similar ring distributor 25a to a further waste gas flue 25, which leads to a stack, which is not shown in the diagram. In this way the waste gases in the heating chamber 12 flow in counterflow to the raw material in the preheating chambers, the flow direction of which is indicated by the arrow 26.

At the lower end of the preheating shafts 11 there are extraction openings 27, which lead to a common carbonization gas pipe 28. A cyclone separator 29 with a closeable extraction outlet 30 is fitted in the carbonization gas pipe 28, to separate out any solid particles which may occur. Further along the carbonization gas pipe 28 there is an exhaust fan 31, by means of which the carbonization gases are sucked out of the preheating shafts by the formation of slight partial vacuum in said shafts. A further section of the carbonization gas pipe 28 leads from the exhaust fan 31 to an air supply inlet 7, in which an inlet 32 for the carbonized gas is provided. From here the carbonization gas is carried in the combustion air into the glass melting furnace 1, where it is completely incinerated.

FIG. 2 illustrates the exhaust fan 31 being connected by the carbonization gas pipe 28 to an air supply inlet 7 to feed vapors and gases into the charging area 2 of the furnace to the burner 4. FIG. 2 illustrates an alternate embodiment in phantom lines wherein the exhaust fan 31 is connected by carbonization gas pipe 28 to an air supply conduit 7a directly to the burner 4 by means of coaxial burner pipes for supplying the combustion air and fuel.

Extraction outlets 33 for the water vapor are provided in the upper area of the preheating shafts 11. These extraction outlets are located in an area where the temperature is such that no decomposition of the organic contaminants takes place. The extraction outlets 33 lead into a common suction pipe 34, which can be connected to the carbonization gas pipe 28 in the manner shown. However, it is also possible to connect the suction pipe 34 directly to the stack which is not shown in the diagram. The heating chamber 12 surrounds the preheating shafts 11, so that an intensive heat transfer through the walls of the preheating shafts 11 is obtained. As already stated the heat exchange takes place in counterflow, so that the highest temperature in the raw material occurs in the lower part of the preheating shafts 11.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

I claim as my invention:

1. A method for preheating charging material containing glass and organic contaminants, in an indirect heat exchanger, comprising at least one preheating shaft and an adjoining heating chamber, to maximum temperatures just below the softening temperature of the glass, for subsequent charging into a glass melting furnace by passing the charging material through said at least one preheating shaft and by passing waste gases from said glass melting furnace through said heating chamber, including at least partially removing any gases and vapors formed from decomposition of said organic contaminants from said heat exchanger and feeding said gases and vapors into said glass melting furnace for combustion therein.

2. A method according to claim 1, including the step of maintaining said at least one preheating shaft at a pressure below ambient pressure.

3. A method according to claim 1, wherein said charging material flows from a top to a bottom of said at least one preheating shaft and said gases and vapors are removed from a lower area of said at least one preheating shaft.

4. A method according to claim 3, wherein water vapor from said charging material is removed from said at least one preheating shaft at a point above said lower area where said gases and vapors are removed, said point being at a temperature range where no decomposition of said organic contaminants has yet taken place.

5. A method according to claim 1, wherein said removed gases and vapors are fed into combustion air for said glass melting furnace.

6. A method according to claim 1, wherein said removed gases and vapors are fed to at least one burner in said glass melting furnace.

7. A method according to claim 1, wherein said waste gases from said glass melting furnace are passed through at least one of a regenerative and recuperative heat exchanger before they enter said indirect heat exchanger.

8. An apparatus for preheating charging material containing glass and organic components to be charged into a glass melting furnace in combination with a glass melting furnace having a charging opening for receiving said charging material, an air supply inlet for combustion air, at least one burner, and a waste gas flue, said apparatus comprising an indirect heat exchanger having a minimum of one preheating shaft for the passage of said charging material and a heating chamber for the passage of a heating medium, adjacent to but separate from said preheating shaft, said waste gas flue of said furnace being connected to said heating chamber, said charging opening of said furnace being connected to said at least one preheating shaft, and a gas pipe connected to said indirect heat exchanger for removing at least some gases formed by decomposition of said organic components in said at least one preheating shaft, said gas pipe being connected to feed said removed gases into said glass melting furnace for combustion therein.

9. An apparatus according to claim 8, wherein said charging material flows from an upper and to a lower end of said indirect heat exchanger and said gas pipe is connected to said heat exchanger at said lower end to said at least one preheating shaft.

10. An apparatus according to claim 8, including an exhaust fan in said gas pipe between said heat exchanger and said furnace.

11. An apparatus according to claim 8, wherein a suction pipe for removing water vapor is connected to said preheating shaft above said connection of said gas pipe.

12. An apparatus according to claim 8, wherein said gas pipe is connected to an air supply inlet for combustion air for said furnace.

13. An apparatus for preheating charging materials containing glass and organic material prior to said charging materials being fed into a glass melting furnace in combination with a glass melting furnace having an air supply inlet for combustion air and a waste gas flue, said apparatus comprising an indirect heat exchanger having a first conduit for carrying said charging materials in heat exchange relationship with exhaust gases from said flue of said glass melting furnace, without direct contact between said charging materials and said exhaust gases and a second conduit connected between said first conduit and said glass melting furnace for removal of gases from said first conduit formed from the decomposition of said organic material as it is heated and for directing said removed gases into said furnace for combustion therein.

14. An apparatus according to claim 13, wherein said first conduits arranged vertically with said materials flowing downwardly and said exhaust gases flowing in a counter direction to said materials.

15. An apparatus according to claim 14, wherein said second conduit is connected to said first conduit at a lower end of said first conduit.

16. An apparatus according to claim 15, including a third conduit for removing water vapor released from said materials in said first conduit, connected to said first conduit above said second conduit.

17. An apparatus according to claim 13, wherein said second conduit is connected to said air supply inlet at said furnace.

18. An apparatus according to claim 13 wherein means as provided in said second conduit for reducing air pressure in said first conduit below ambient.

* * * * *

UNITED STATES PATENT AND TRADEMARK OFFICE
CERTIFICATE OF CORRECTION

PATENT NO. : 5,399,181
DATED : March 21, 1995
INVENTOR(S) : Helmut Sorg

It is certified that error appears in the above-indentified patent and that said Letters Patent is hereby corrected as shown below:

Column 4, line 16 should read --line III in Fig. 1--.

Signed and Sealed this

Seventeenth Day of October, 1995

Attest:

BRUCE LEHMAN

*Attesting Officer*   *Commissioner of Patents and Trademarks*